US006356851B1

(12) United States Patent
Young et al.

(10) Patent No.: US 6,356,851 B1
(45) Date of Patent: Mar. 12, 2002

(54) ACCELERATED CALIBRATION FOR ELECTRONIC COMPASS MODULE

(75) Inventors: Kevin I. Young, Troy; Joseph F. Supinsky, Shelby Township; Paul A. Michaels, Livonia, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/245,260

(22) Filed: Feb. 5, 1999

(51) Int. Cl.[7] .............................................. G01C 17/38
(52) U.S. Cl. ............................ 702/92; 33/356; 33/357; 73/1.76; 701/224
(58) Field of Search ........................... 702/92, 93, 104; 73/1.75, 1.76; 33/356, 357, 361; 343/713; 701/224, 205, 207

(56) References Cited

U.S. PATENT DOCUMENTS

| | | | |
|---|---|---|---|
| 3,991,361 A | 11/1976 | Mattern et al. | 324/43 R |
| 4,414,753 A | 11/1983 | Moulin et al. | 33/356 |
| 4,546,551 A | 10/1985 | Franks | 33/356 |
| 4,807,462 A | 2/1989 | Al-Attar | 73/1 E |
| 4,831,563 A | 5/1989 | Ando et al. | 702/92 |
| 4,852,012 A | 7/1989 | Kaisha | 702/92 |
| 4,953,305 A | 9/1990 | Van Lente et al. | 33/356 |
| 5,187,872 A | 2/1993 | Dufour | 33/356 |
| 5,255,442 A * | 10/1993 | Schierbeek et al. | 33/361 |
| 5,390,122 A * | 2/1995 | Michaels et al. | 702/92 |
| 5,761,094 A | 6/1998 | Olson et al. | 364/559 |
| 6,014,610 A * | 1/2000 | Judge et al. | 702/92 |

* cited by examiner

Primary Examiner—Kamini Shah
(74) Attorney, Agent, or Firm—Thomas A. Twomey

(57) ABSTRACT

A system for calibrating an electronic compass for a vehicle of the type employing a Forward and Lateral magnetoresistive magnetic field sensor. As the vehicle changes headings, the system periodically samples and digitally stores the peaks of the sensor outputs. When the stored peaks indicate a minimum change in the output of the sensors, the system microcomputer calculates a "box" surrounding the subscribed arc of heading changes and computes the center of the "box" as the center of the locus of anticipated peaks for all quadrants and shifts the locus (i.e., "box") to be within the domain of the A/D converter to prevent saturation, which could otherwise occur in the presence of strong remnant magnetic fields in the vehicle. The "box" is updated with each sampling of sensor outputs until the vehicle is eventually headed through all four cardinal compass headings, and the compass is then considered to be fully modeled in the microcomputer.

9 Claims, 6 Drawing Sheets

START OF ARC DETECTION

VALID ARC DETECTED

CALCULATING INITIAL
COMPASS MODEL

CURRENT DATA POINT
IN SW QUADRANT

TWO QUADRANTS VISITED

THREE QUADRANTS VISITED

ALL QUADRANTS VISITED

FINAL MODEL INTEGRITY CHECK

ACCELERATED CALIBRATION FOR ELECTRONIC COMPASS MODULE

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to electronic compasses of the type mounted on a dash or headliner of a vehicle for providing a continuous readout of the vehicle heading during operation.

In service, problems have been encountered with electronic compasses in vehicles during the initial calibration and subsequent calibration attempts. A known procedure for automatically recalibrating the compass during operation is that shown and described in U.S. Pat. No. 5,390,122 issued in the name of P. A. Michaels, et al which describes a procedure for initially calibrating the compass on the vehicle assembly line during manufacture and references an alternative way by driving in circles and describes a way of automatically calibrating the compass to update the calibration coefficients of the sensors.

In the aforesaid initial calibration of an electronic compass for vehicles, care must be exercised when measuring the magnetic field during the assembly of the vehicle to determine the proper offsets to calibrate the compass module. Typically in an automotive vehicle assembly plant, the equipment on the vehicle assembly line is metallic and affects the nearby earth magnetic field. Typically, a certain designated area is used for compass calibration; however, if any of the equipment is moved in the designated area, the factory calibration of the compass may be affected and result in inaccurate initial calibration. If this occurs, the magnetic field in the designated calibration area must be re-measured and new calibration offsets determined.

The known technique for recalibrating a compass requires that the car be driven in the four cardinal directions (i.e., N, E, S, W) in sequence and at a fixed or constant rate before a complete set of corrections can be applied.

It has been desired to provide a way or means of providing a rapid automatic calibration or recalibration of an electronic compass for a vehicle during normal driving.

BRIEF SUMMARY OF THE INVENTION

The present invention provides accelerated calibration of an electronic compass for vehicle of the type employing magnetoresistive sensors. The system may be activated by a user operated panel switch or by a condition developing with a known slow automatic calibration routine in the event that the system detects that it has been forced into an unrecoverable state. The accelerated calibration technique of the present invention does not require the driver to drive in any set pattern such as a circle: it only requires that the four cardinal headings be visited at least once.

The accelerated or fast automatic calibration technique of the present invention detects and records high and low peaks in the output of the magnetoresistive sensors detecting respectively Forward and Lateral variations in the combination of remnant and Earth magnetic fields over time. The technique of the present invention eliminates the need for the vehicle to be driven in the four cardinal directions in sequence and at a constant rate in order to complete the compass model in the computer. The technique of the present invention is initiated when it is determined that the vehicle has been driven in an arc sufficient to generate a minimum threshold change in the output of both the Lateral and the Forward magnetoresistive sensors, whereupon the system models an arc and computes the center of curvature as the center of the locus in order that the current quadrant can be determined. A "box" is then calculated with the computed center computed for determining the four quadrants as contrasted with cardinal headings. The "box" is updated with each sampling and when the vehicle has, over time, been driven in all quadrants, the model is complete. The "box" will always contain the circle of the peaks of the sensor outputs from all four cardinal directions. The mapped circle is then shifted to be located within the limits of the outputs of the system amplifiers such that saturation is avoided; the compass readings detected are thus valid for determining headings and are not unduly influenced by the remnant magnetic fields.

DETAILED DESCRIPTION OF THE INVENTION

Figure 1:
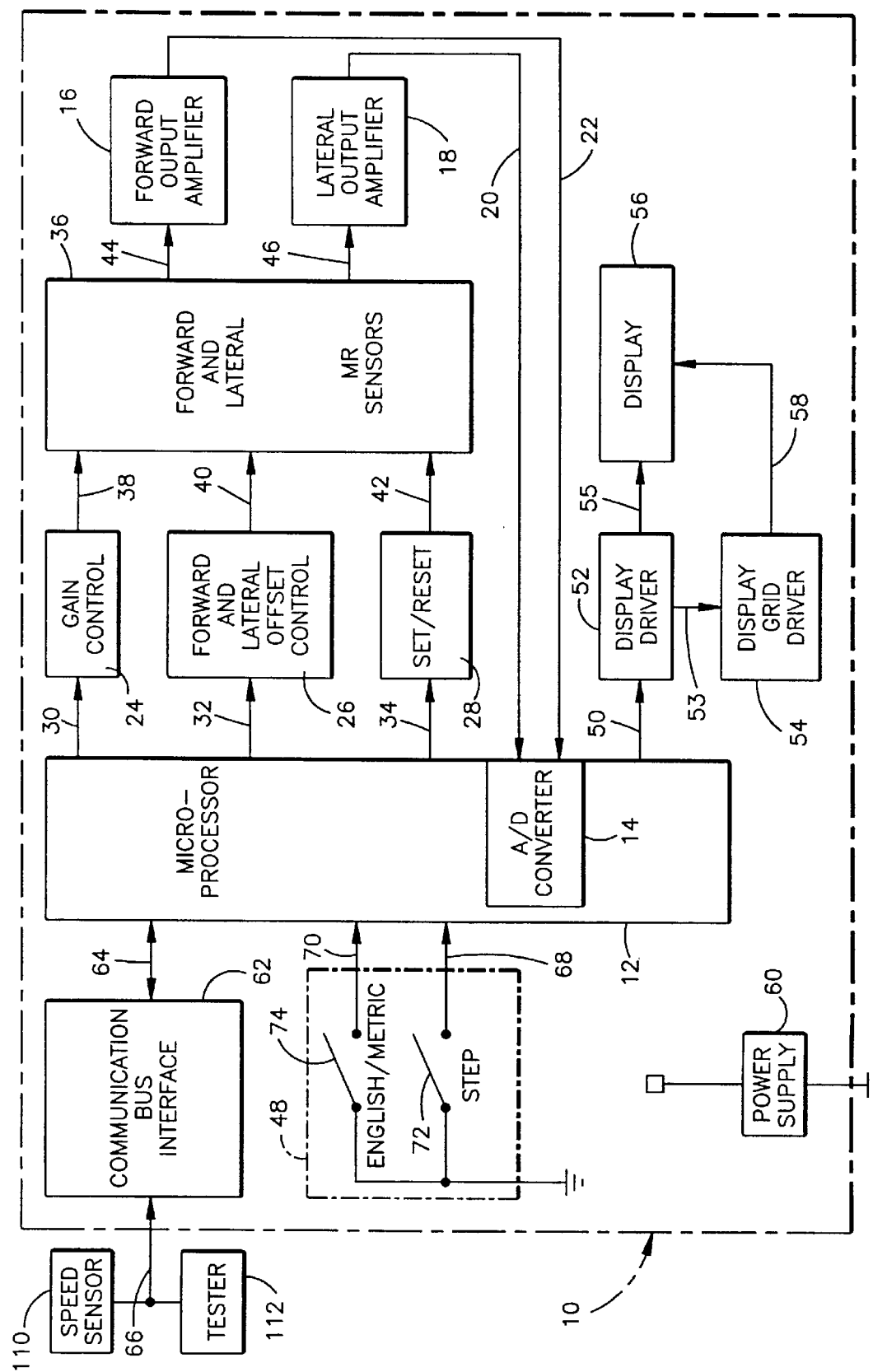
FIG. 1 is a block diagram of the compass module of the present invention.

Referring to FIG. 1, the system or module of the present invention is indicated generally at 10 and has a microprocessor or microcontroller 12 which includes an analog to digital converter 14 which receives output signals from a Forward output amplifier 16 and a Lateral output amplifier 18 along lines 20, 22 respectively. The microcontroller 12 provides inputs to the gain control section 24, the Forward and Lateral offset control section 26 and the set/reset section 28 respectively along lines 30, 32, 34.

The gain control 24, the offset control 26 and the set/reset 28 provide inputs to the Forward and Lateral magnetoresistive (MR) sensors in section 36 respectively along lines 38, 40, 42. The MR sensor section 36 provides separate inputs to the Forward output amplifier 16 and Lateral output amplifier 18 along lines 44, 46, respectively, for providing the directional response to movement of the vehicle with respect to the earth's magnetic field.

The microprocessor section 12, operating mode and display characteristics are controlled by a user-actuated switch section 48; the A/D converter section 14 provides an output along line 50 to the display driver section 52 which provides outputs to the display grid driver 54 along line 53 and along line 55 to the display unit 56, which receives an output also from the display grid driver along line 58. The system also includes a power supply comprising section 60, which provides the low voltage direct current power to the various sections of the system 10.

The microprocessor section 12 also provides an output to and receives inputs from a communication bus interface section 62 along line 64. The communication bus interface section 62 is adapted for connection to the vehicle bus along line 66.

The switch section 48 includes user operated manual switches 72 and 74 which provide inputs to the microprocessor along lines 68, 70. Switch 74 is typically a selector switch for user-desired selection of the display mode (i.e., in either English or metric units); whereas, switch 72 is a user input for requesting accelerated calibration for the system.

The Forward and Lateral magnetic sensors respectively are typically solid state devices containing magnetoresistive strips arranged as a Wheatstone bridge currently obtainable from Phillips Electronics, Donnelly Corp. and Honeywell Electronics. It will be understood by those skilled in the art that the Lateral sensor is disposed on the vehicle to sense the magnitude of the combined remnant and Earth field in a direction lateral of the motion of the vehicle; and, the Forward sensor is disposed and oriented on the vehicle to sense the magnitude of the combined Earth and remnant magnetic fields in the direction of motion of the vehicle. It will be understood that the Lateral and Forward MR sensors are connected in a Wheatstone bridge circuit in a manner known in the art.

The variable gain is useful in preserving the system accuracy as the magnitude of the Earth's magnetic field changes in different latitudes. Typically the earth's magnetic field varies over the range of 80 to 400 milliGauss, a 5:1 range. The offset control section 26 is used to back out the vehicle's magnetic remnant field at the location of the sensor. Currently available magnetoresistive sensors provide an offset coil within the sensor body for this purpose.

The set/reset circuit section 28 receives an input denoted by line 34 in FIG. 1 from the microprocessor along line 34 and provides an output to the Forward and Lateral sensor section 36. The set/reset circuit 28 is used to recover the sensors after exposure to a strong disturbing magnetic field. A negative current pulse will reset the sensor to reversed sensitivity. Periodically alternating flipping pulses and a lock in amplifier are used so that the output will become independent of sensor and amplifier offset.

The microprocessor section 12 controls all of the necessary signals to make the compass circuit operate and includes the A/D converter which converts the analog signals generated from the magnetoresistive sensors to a digital form and stores the peak values therein in a register contained therewith. The microprocessor section 12 analyzes the digital data and calculates the magnetic heading to which the vehicle is pointing. The microprocessor then sends the information to the display driver section 52, which in turn supplies the heading in an eight point alpha-numeric format (N, NE, E, SE, S, SW, W, NW). The microprocessor section 12 also provides the control signals to the gain control section 24, the offset control section 26 and the set/reset section 28.

The display driver sections 52, 56 drives the display with appropriate voltage levels on the grids and anode inputs. The display is usually made up of many segments and the driver is used to interface the microprocessor to the display. The microprocessor 12 sends the data to the display driver 52 in serial format; and, the display driver 52 outputs the data to the display section 56 in a parallel format. The data is latched into the display driver 52 until the microprocessor 12 sends it new data.

The display 56 is used to provide the current compass heading to the vehicle operator. The output can be in alpha-numeric format (N, NE, E . . . ) or in degrees format in 1° increments. The display is typically a vacuum fluorescent type, but it will be understood that other types such as liquid crystal displays may be employed.

Figure 2:
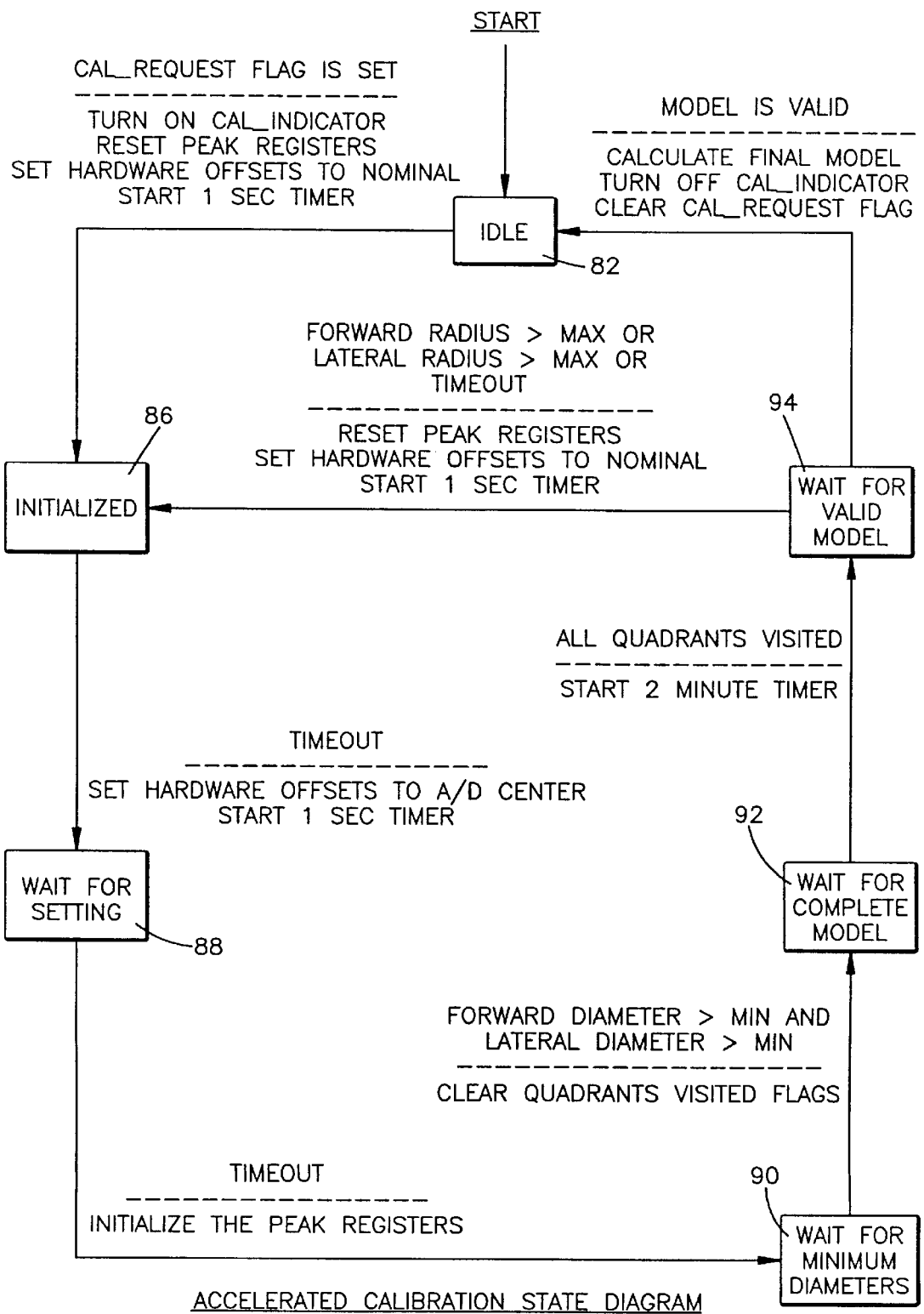
FIG. 2 is a calibration state diagram for the system of FIG. 1.
Figure 3:
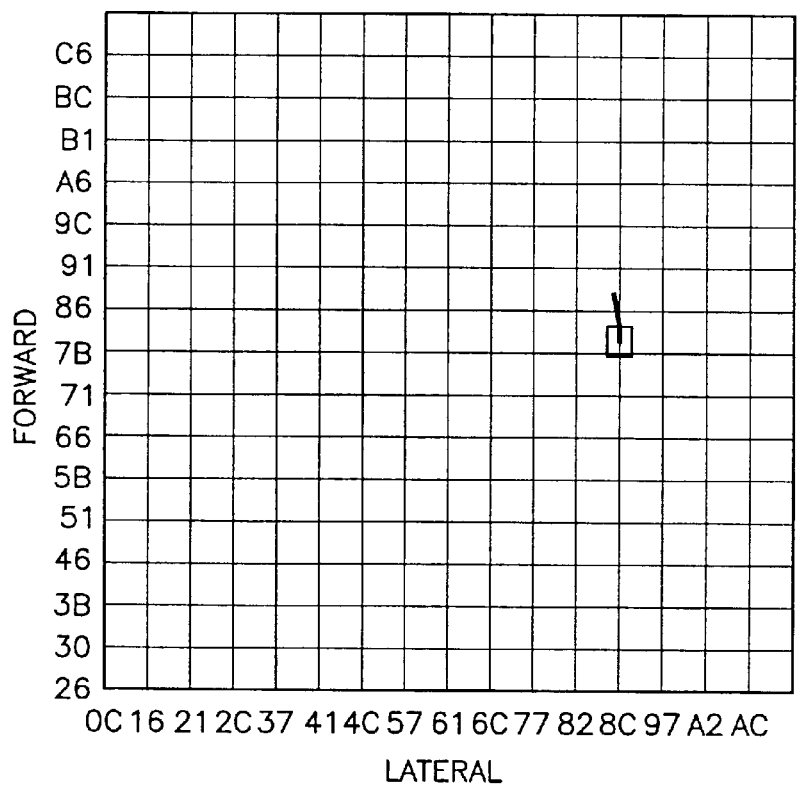
FIG. 3 is a plot of the locus of the initial readings of the Forward and Lateral magnetoresistive sensors.

Referring to FIGS. 1 and 2, the communication bus interface section 62 is connected to the microprocessor section 12 to receive and send information from other modules in the vehicle. The compass computing algorithm employed in the present invention uses vehicle speed from sensor 110 in determining if the signal from the magnetoresistive sensors is valid or not. The communication bus interface 62 is also used to communicate to a tester 112 when the module is being tested.

Referring to FIG. 2, the system 10 of the present invention calculates a compass heading based on the sensor measurements of the combined earth and remnant magnetic field in the Forward direction, and in the Lateral direction, from the outputs of the Forward and Lateral magnetoresistive sensors. The compass heading is calculated based on the angle of the vector sum of these two measurements.

Figure 4:
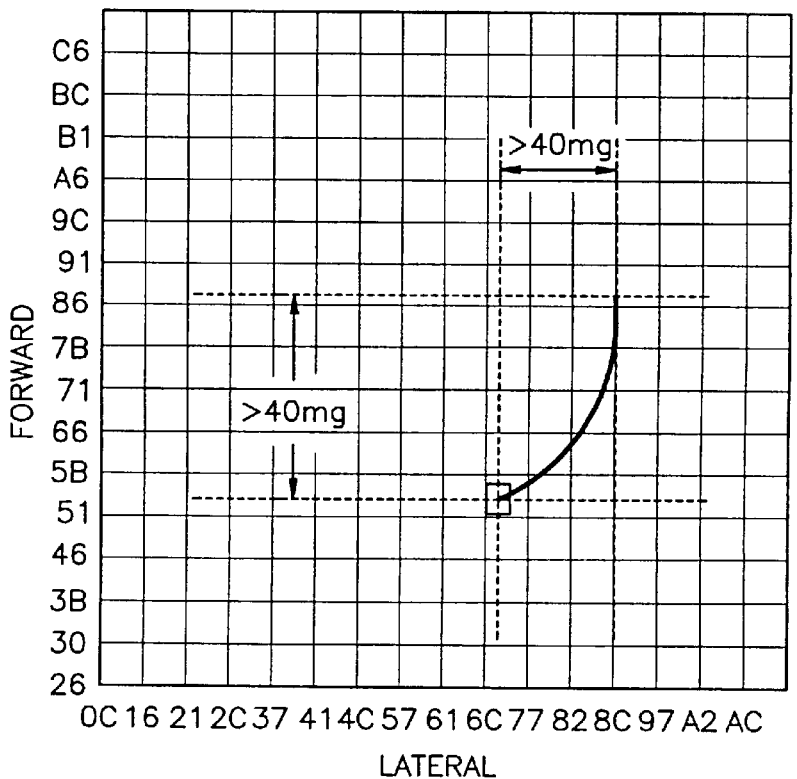
FIG. 4 is a plot of the sensor output coordinates for the vehicle traveling in an arc.

The system 10 of the present invention performs accelerated automatic calibration of the compass by detecting and recording high and low peaks in the output of the Forward and Lateral MR sensors over time. When a full circle has been eventually driven, the recorded peaks provide a complete model of the actual compass detected signals. The inherent difficulty with this technique is determining when a complete circle has been driven by the vehicle. The present invention addresses this problem in two steps: the first is accumulating enough measurements or readings while the vehicle is being driven until the respective Lateral and Forward sensors have detected variations in the magnet field of at least one half of the smallest expected magnetic earth field of 80 milliGauss, e.g., 40 milliGauss on each of the Lateral and Forward axis which will form an arc. The measurements are taken while the vehicle is being operated until at least 40 milliGauss change in each of the Lateral and Forward sensors is experienced and, thus, provides heading changes subscribing an arc, which is distinguishable from ambient or remnant field "noise" but which is less than a completed circle. This condition is illustrated in FIG. 4 which shows the arc traversed by the vehicle plotted within the signal domain of the A/D converter 14, which it will be understood, must not be driven to saturation in order to obtain valid compass readings. It will be understood with reference to FIG. 4 that each of the plotted points represents an instantaneous compass bearing. In the present practice of the invention a sampling rate of three times per second has been found satisfactory; however, it will be understood that other sampling rates may be employed if desired. The rate of change of data is non-linear; and, it will be understood that a rapid change of direction changes the filter time constant which must be maintained such that the X-Y coordinate representing Forward and Lateral sensor outputs of all compass headings remain inside those of the four cardinal headings. In the present practice of the invention the A/D converter has a domain of plus or minus two Gauss in the Forward direction and plus or minus two Gauss in the Lateral direction.

The system then computes a "box" with each new sample and then calculates the center of the "box" formed by the data taken. It being understood that the center of the "box" is less than the radius of the actual full circle, and thus, it is concluded that the computed center of the box is within the full circle of data points to be taken when the vehicle has traversed all four cardinal headings, i.e., traveled in a full circle.

It is then possible to calculate the heading from the computed center of the "box" as a first approximation of the actual magnetic heading once the center of the box is established. Subsequently the relative quadrant of continued readings can be determined; and, subsequent readings (e.g., data points) are used to enlarge the box until all quadrants have been visited. The full circle is then modeled for calibrating the compass such that all sensor outputs will be kept within the domain of the A/D converter.

Figure 5:
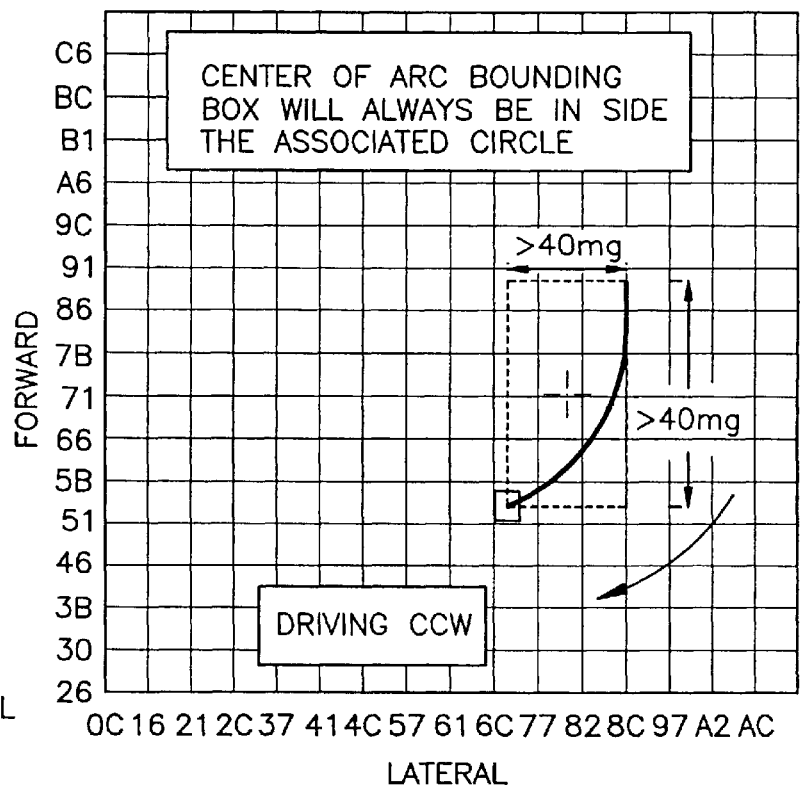
FIG. 5 is a plot of the sensor output coordinates having the locus of the model coordinates superposed thereon.
Figure 6:
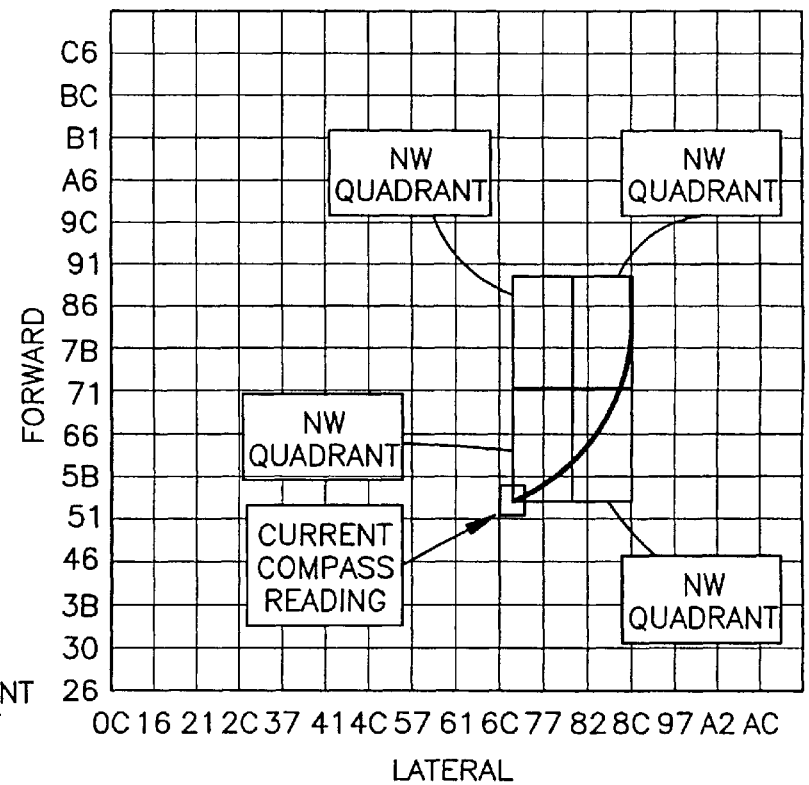
FIG. 6 is a view similar to FIG. 5 showing the locus divided into quadrants.

Referring to FIG. 5, the data points are shown plotted for an initial arc of vehicle movement producing at least 40 milliGauss change in the output of each of the Lateral and Forward sensors; and, as shown in FIG. 6 the center of a "box" bounding the traversed arc is calculated and corresponding quadrants determined based upon the calculated center of the "box."

Figure 7:
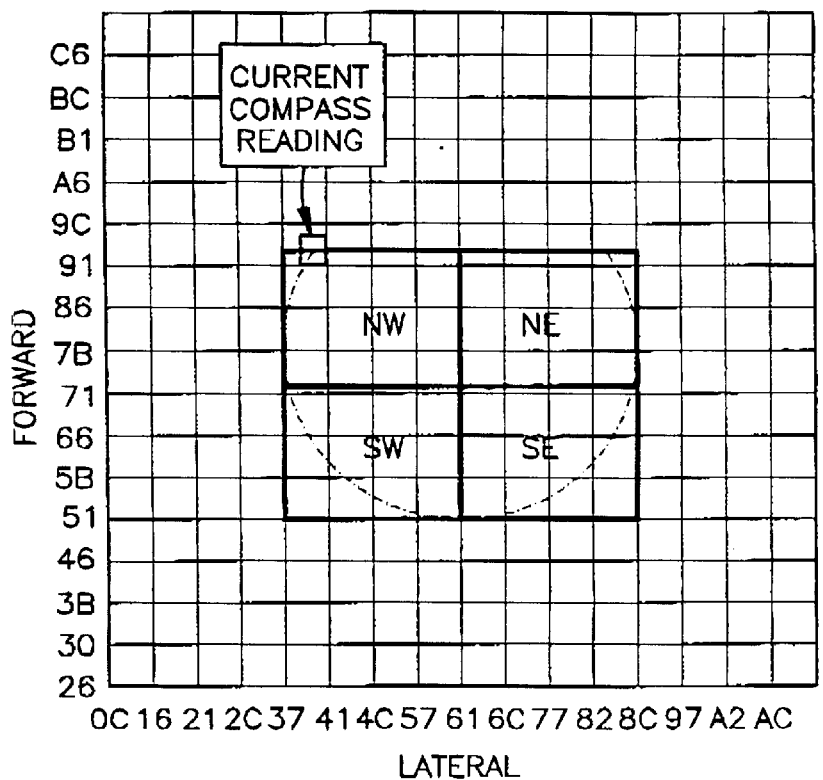
FIG. 7 is a view similar to FIG. 6 illustrating the locus of the sensor output coordinates after the vehicle has traversed at least two quadrants.
Figure 8:
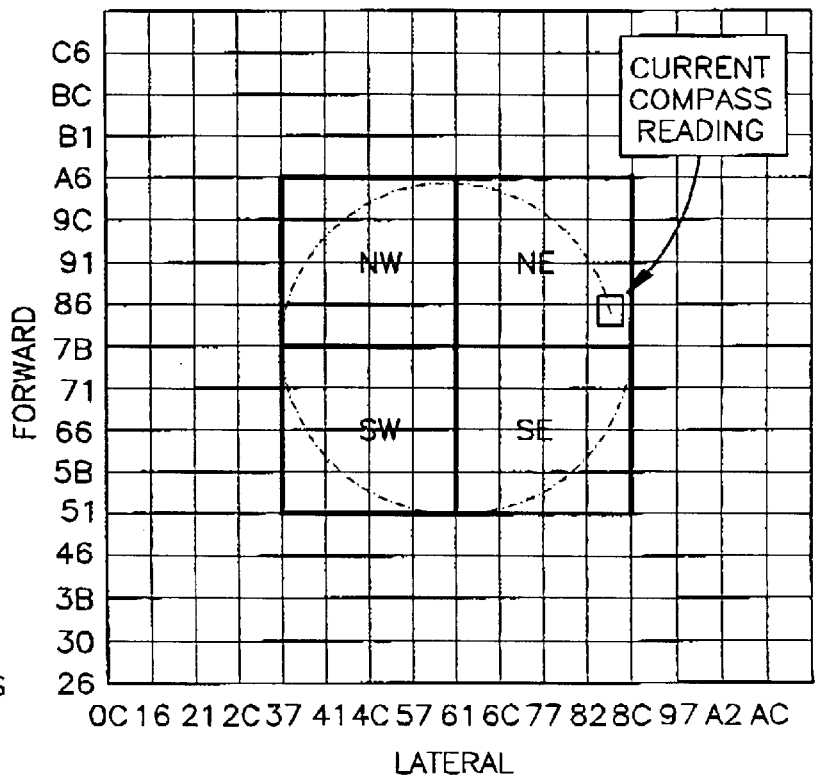
FIG. 8 is a view similar to FIG. 7 illustrating the locus of the sensor output coordinates after the vehicle has traversed headings in at least three quadrants.
Figure 9:
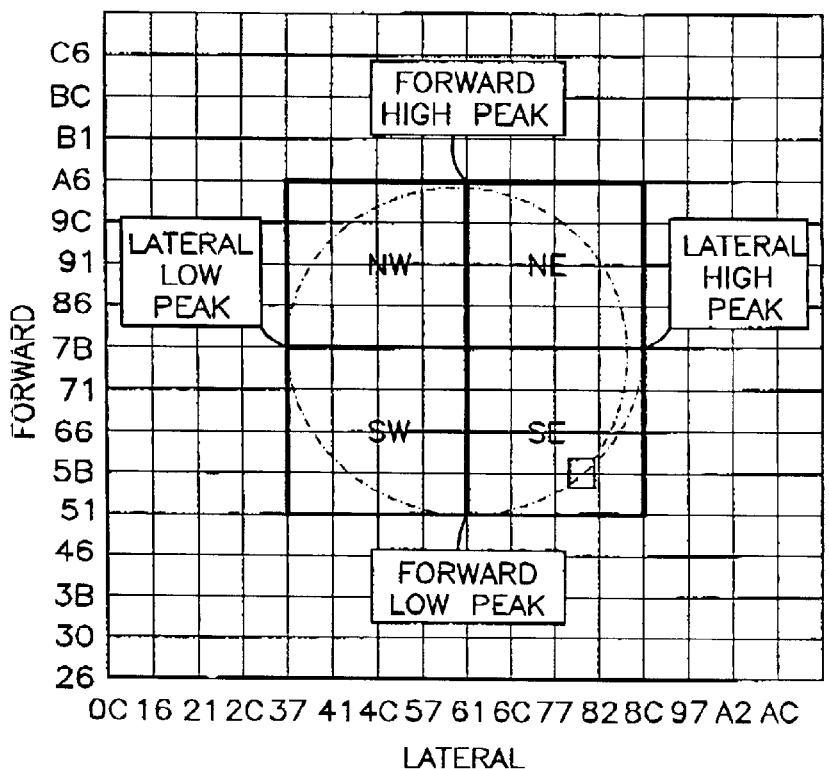
FIG. 9 is a view similar to FIG. 8 illustrating a plot of the sensor output coordinates after the vehicle has traversed a path including the four cardinal directions; and, FIG. 10 is a view similar to FIG. 9 showing the computer model of the locus of the compass coordinates superposed thereon for determining that the model is valid.
Figure 10:
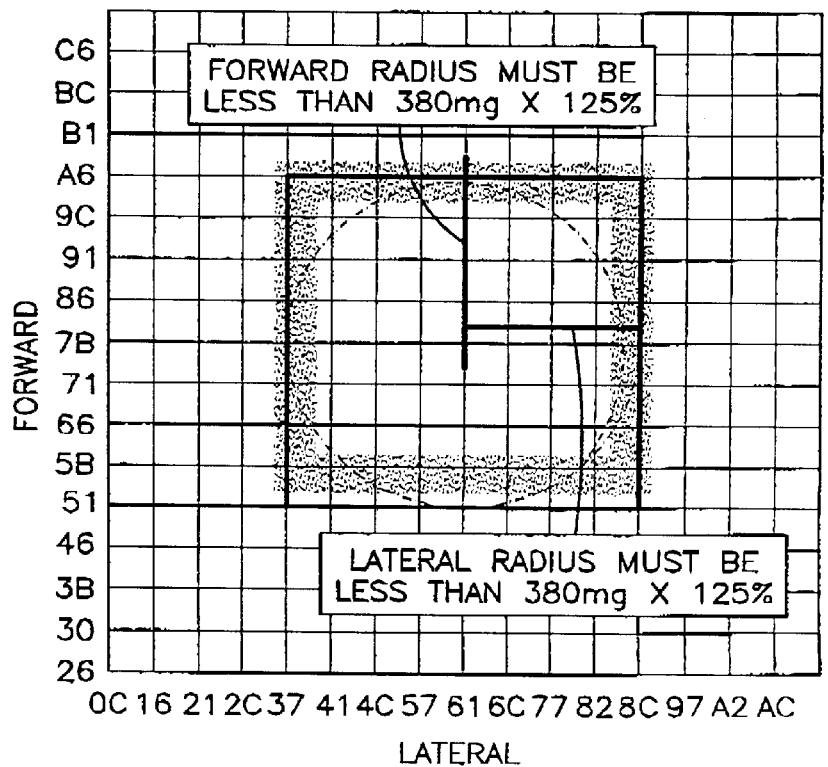

Referring to FIGS. 3–10, as the vehicle is driven in additional quadrants, the "box" is continuously redefined and enlarged or updated to encompass the accumulated data points and the center of the box is recalculated with each sampling. When the vehicle has been driven in all four quadrants as shown in FIG. 9, the compass is deemed to be fully modeled subject to an integrity check which determines whether the Forward radius of the data point circle is less than 475 milliGauss; and a determination is made whether the Lateral radius is less than 475 milliGauss, as shown in FIG. 10. If the radius of the completed circle meets this latter test, the compass is deemed fully modeled and calibrated. The progression of the data sampling as the vehicle is driven in two, three and all four quadrants is illustrated in FIGS. 7 through 9. The integrity check is illustrated in FIG. 10.

Referring to FIG. 2, a change of state diagram is illustrated for the system 10 wherein the system remains in the idle state at 82 until an operator request is received, i.e., START, representing closure of the switch 70 for the operator calling for calibration. The CAL-REQUEST flag is set and the CAL-INDICATOR is turned on, and resets the peak registers and hardware offsets to nominal and starts a timer having an interval of about one second and goes to the initialized state 86.

Upon time out of the timer at state 86 the system turns on the calibration indicator light and clears the calibration request flag and begins a one second timer. Upon completion of the time out from state 86, the system changes the offset of the sensor amplifiers to provide sensor output signals which are centered within the domain of the A/D converter and starts a one second timer. The system waits at state 88 upon time out of the one second timer and waits for the minimum or threshold level of output of the MR sensors at state 90. When the change in detected MR sensor signals is greater than a minimum threshold, the system clears the Quadrants Visited flag and waits for a completed model at state 92.

As the vehicle is eventually moved through various quadrants, the quadrant visited flags are cleared; and, as long as the change in sensor heading outputs is greater than the minimum threshold, when all quadrants have been visited, the system sets the CAL-REQUEST flag and turns off the CAL-INDICATOR. When all quadrants have been visited at state 92, a two minute timer is started; and, the system upon completion of the two minute time interval waits for a valid model at state 94.

If the model is valid, the system calculates the final model, turns off the CAL-INDICATOR and clears the CAL-REQUEST flag. The system then remains at idle state 82 until the subsequent operator request is initiated.

If at state 94 either the Forward sensor amplifier output or the Lateral sensor amplifier output is greater than the maximum permitted, or that a time out has occurred, the system will reset the peak registers, set the sensor offsets to nominal, start a one second timer and reinitialize at state 86.

The present invention thus provides a unique and novel way of recalibrating an electronic compass for vehicle upon operator request, by calculating the anticipated center of the compass readings based upon the vehicle traversing an arc sufficient to generate Forward and Lateral magnetoresistive sensor signals representing a change of vehicle heading of a minimum threshold amount. With each sampling, a region or "box" is calculated on the assumption that the arc of headings traversed represents movement in a certain quadrant. The system is then able to create a model of anticipated censor signal outputs for the vehicle traversing a complete circle. The "box" thus represents the anticipated peak readings of the system based upon a limited arc of vehicle traverse. The calculated "box" can be updated and enlarged as the vehicle moves through additional quadrants to allow the system to keep the locus of all the anticipated readings within the domain of the limits of the A/D converter. Thus, the system can be recalibrated without the need for driving the vehicle sequentially at a constant rate in a full circle. When the vehicle has eventually completed a full circle, the model is considered to be completed and the compass is fully recalibrated.

Although the invention has hereinabove been described with respect to the illustrated embodiments, it will be understood that the invention is capable of modification and variation and is limited only by the following claims.

What is claimed is:

1. A system for calibrating an electronic compass of the type mounted on a moving vehicle comprising:
   (a) a first and second magnetoresistive sensor disposed at generally right angles and disposed on the vehicle for sensing the effect of combined earth and remnant magnetic fields;
   (b) circuit means connected to said first and second magnetoresistive sensors, said circuit means including:
      (i) bridge means operable to provide an electrical indication of resistance changes in each of said first and second sensors from sensed changes in said fields;
      (ii) converter means for converting said electrical indication of said first and second sensors to digital values;

(iii) means for periodically sampling said digital values;

(iv) register means operable to detect and store peaks of said sampled digital values;

(v) microcomputer means for computing the anticipated locus of the digital values for the headings of the compass based upon said stored values for a minimum change in vehicle heading less than a full circle, said microcomputer means further operable for shifting said anticipated locus for said values to be within the limits of said converter means; and, (vi) means for determining the instantaneous bearing from the said sampled digital values with respect to the center of said shifted locus;

(c) means for displaying said instantaneous bearing.

2. The system defined in claim 1, further comprising electrically energizable means operable for neutralizing the effects of the remnant fields on said first and second sensors.

3. The system defined in claim 1, wherein said microcomputer means determines the bearing for said sensed resistance changes for changes in combined field in excess of a predetermined threshold.

4. A method of calibrating an electronic compass in a moving vehicle comprising:

(a) disposing a first and second magnetoresistive sensor on the vehicle and orienting one of said first and second sensors to sense changes in the combined earth and remnant magnetic fields in the direction of vehicle movement and the other of said sensors to sense said combined fields transverse to said direction of vehicle movement;

(b) connecting said first and second sensors in a circuit and sensing the changes in electrical resistance of said sensors with changes in direction of vehicle movement in said combined fields and providing an electrical signal indicative of said resistance changes;

(c) periodically sampling said electrical signal and converting said signal to digital values and storing in a memory the peak values thereof;

(d) computing the anticipated coordinates of the center of the locus of said changes in magnetic headings from said stored peak values for changes in vehicle headings less than a full circle;

(e) shifting the center of said locus such that said locus does not exceed the limits of said converter;

(f) computing the coordinates of said instantaneous sampling and determining the magnetic bearing with respect to said shifted center; and, (g) displaying said magnetic bearing.

5. The method defined in claim 4, wherein said step of sensing includes neutralizing said remnant field.

6. The method defined in claim 4, wherein said step of computing the anticipated coordinates of the center of locus of headings includes delaying until said sensors have detected a minimum change in field strength on each of the sensors.

7. A method of substantially calibrating an electronic compass in a moving vehicle comprising:

(a) disposing a first and second magnetoresistive sensor on a vehicle and orienting one of said first and second sensors to sense changes in the combined Earth and remnant magnetic fields in the direction of vehicle movement and the other of said sensors to sense said combined fields transverse to said direction of vehicle movement;

(b) connecting said first and second sensors in a circuit and sensing the changes in electrical resistance of said sensors within the heading of vehicle movement in said combined fields and providing an electrical signal indicative of said resistance changes;

(c) periodically sampling said electrical signal and storing the peak values thereof;

(d) computing the changes in said stored values and determining when said computed changes have reached a threshold level;

(e) computing the coordinates of the anticipated center of the locus of said changes in magnetic headings when said threshold has been reached;

(f) computing a box bounding the coordinates of said changes and determining the Earth magnetic quadrant of said changes in heading; and (g) shifting said box to be within the domain of said electrical signal in said circuit.

8. The method defined in claim 7, wherein said step of periodically sampling and storing includes converting said electrical signal from analog to digital.

9. The method defined in claim 7, wherein said step of computing a box includes computing said box with each sampling until said changes in heading have traversed a full circle.

* * * * *